(12) United States Patent
Arakawa

(10) Patent No.: US 8,970,928 B2
(45) Date of Patent: Mar. 3, 2015

(54) IMAGE FORMING APPARATUS, CONTROL METHOD THEREOF AND STORAGE MEDIUM

(71) Applicant: Canon Kabushiki Kaisha, Tokyo (JP)

(72) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/859,078

(22) Filed: Apr. 9, 2013

(65) Prior Publication Data

US 2013/0293936 A1    Nov. 7, 2013

(30) Foreign Application Priority Data

May 7, 2012    (JP) .................................. 2012-106316

(51) Int. Cl.
| | |
|---|---|
| H04N 1/04 | (2006.01) |
| H04N 1/40 | (2006.01) |
| G06F 3/12 | (2006.01) |
| G06K 15/00 | (2006.01) |
| G03G 15/00 | (2006.01) |
| G03G 15/01 | (2006.01) |
| B41F 13/64 | (2006.01) |
| G06F 17/00 | (2006.01) |
| H04N 1/12 | (2006.01) |
| H04N 1/00 | (2006.01) |
| H04B 1/12 | (2006.01) |

(52) U.S. Cl.
CPC ........... *H04N 1/121* (2013.01); *H04N 1/00578* (2013.01); *H04N 1/0058* (2013.01); *H04N 1/00596* (2013.01); *H04N 1/00649* (2013.01); *H04B 1/12* (2013.01); *H04N 2201/044* (2013.01); *H04N 2201/0091* (2013.01)

USPC ......... 358/498; 358/1.13; 358/448; 358/1.16; 358/1.14; 358/1.17; 399/404; 399/54; 399/405; 399/21; 270/18; 235/375

(58) Field of Classification Search
USPC .......... 358/498, 1.13, 448, 1.12; 399/404, 54; 270/18; 235/375
See application file for complete search history.

(56) References Cited

U.S. PATENT DOCUMENTS

| | | | |
|---|---|---|---|
| 2008/0257950 A1* | 10/2008 | Kurokawa | 235/375 |
| 2009/0180787 A1* | 7/2009 | Bober | 399/21 |
| 2013/0135652 A1* | 5/2013 | Kobayashi | 358/1.13 |

FOREIGN PATENT DOCUMENTS

JP    2000-185881 A    7/2000

* cited by examiner

*Primary Examiner* — Charlotte M Baker
*Assistant Examiner* — Rury Grisham
(74) *Attorney, Agent, or Firm* — Fitzpatrick, Cella, Harper & Scinto

(57) ABSTRACT

This invention provides a technique of preventing a collision between an original document and a printing material on a conveyance path when an image forming apparatus executes both additional printing on the original document and printing on the printing material. In a case where both additional printing on an original document and printing on a printing material are executed, the image forming apparatus according to one aspect of the invention conveys a read original document to a transfer unit through a conveyance path commonly used for an original document and sheet, and prints an image to be added on the original document. After the original document is conveyed to the transfer unit through the conveyance path, the image forming apparatus feeds a sheet from a sheet feeding unit to the conveyance path, and performs copying on the sheet in the transfer unit.

13 Claims, 13 Drawing Sheets

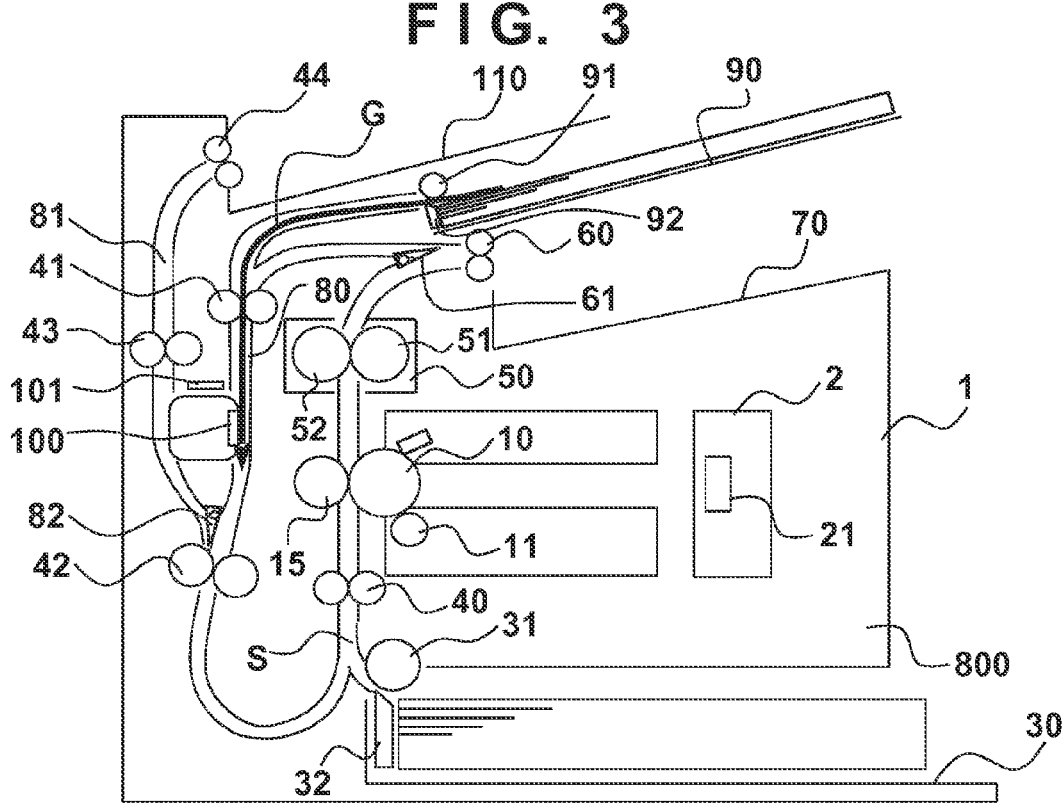

F I G. 11C
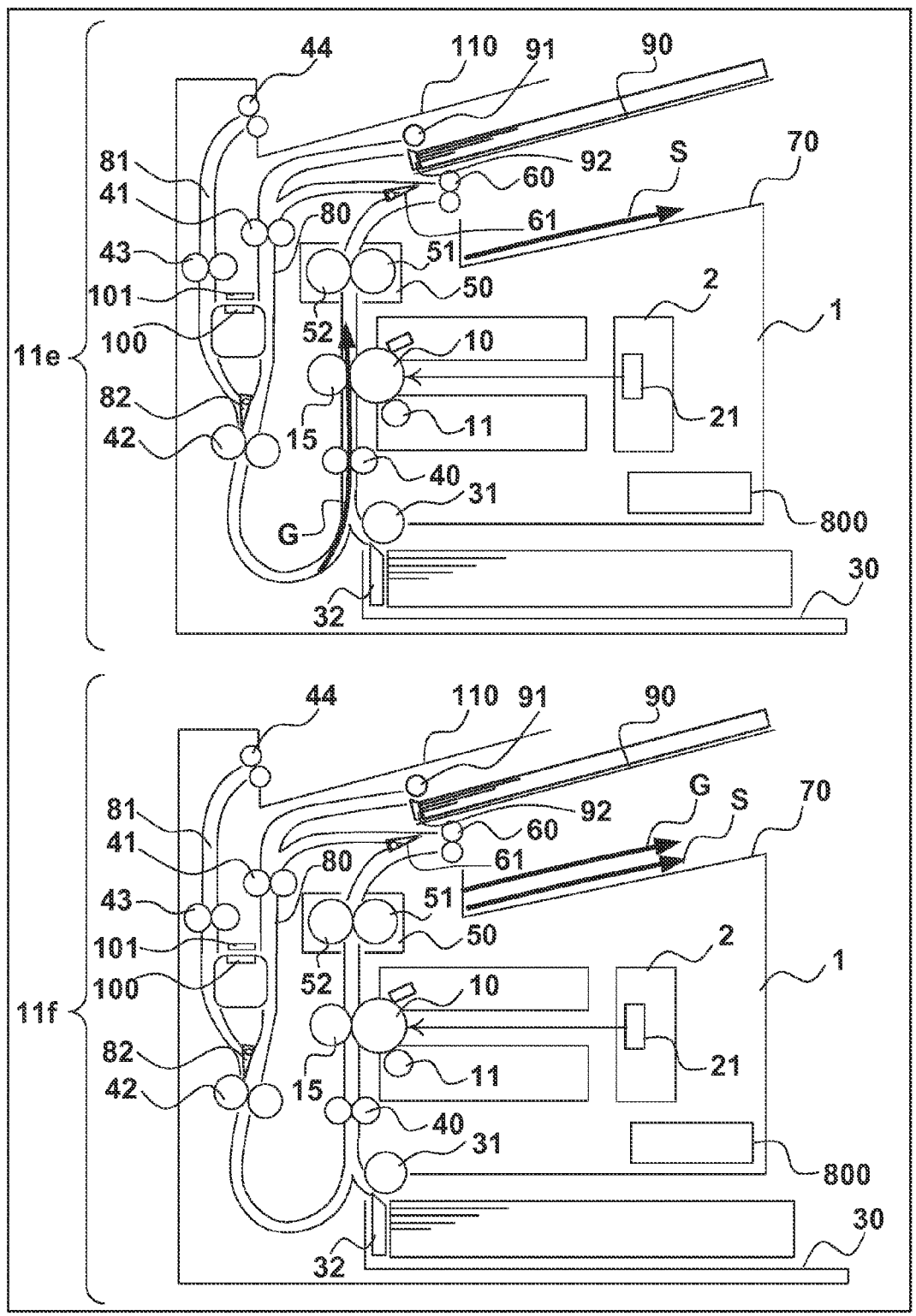

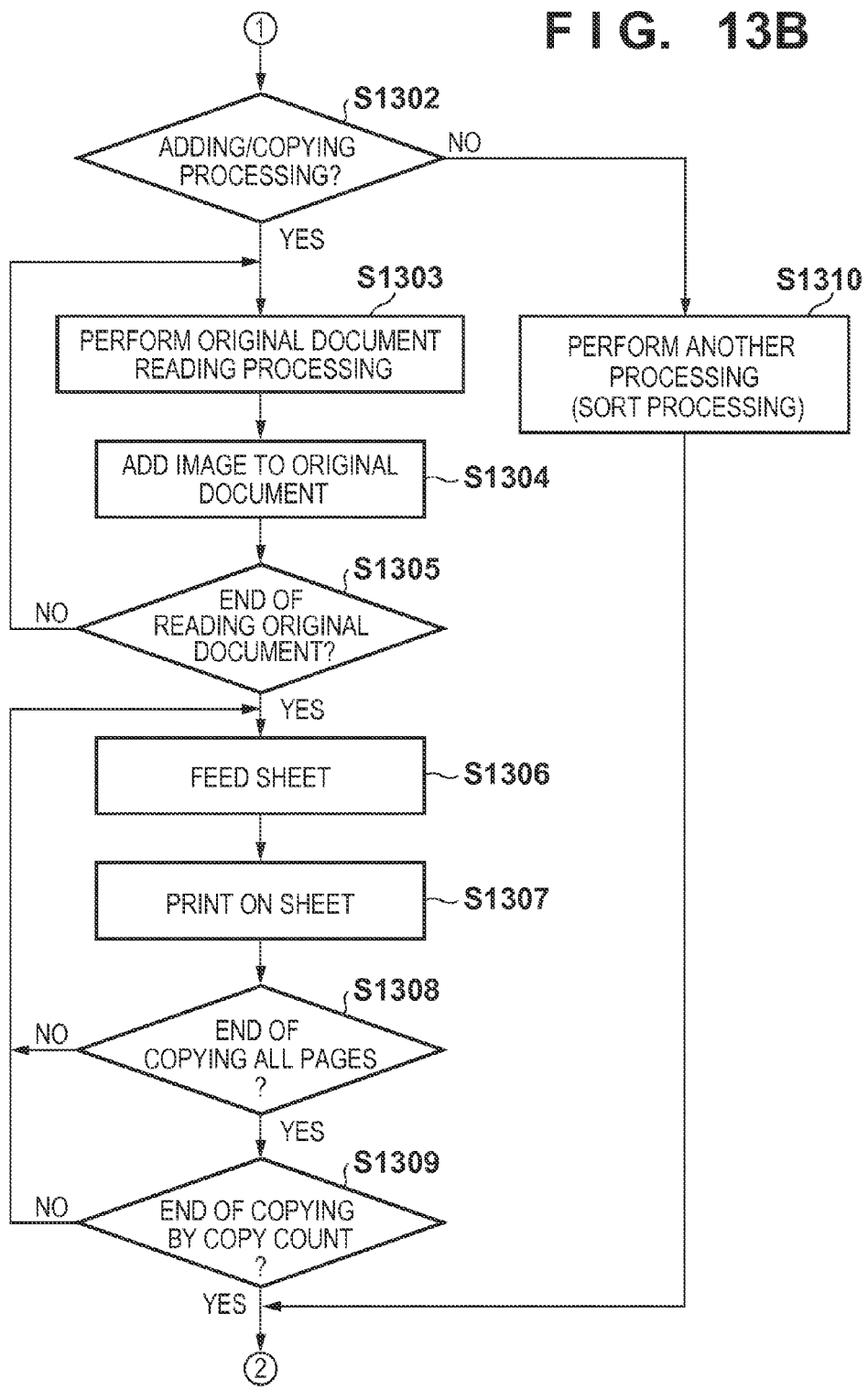

US 8,970,928 B2

IMAGE FORMING APPARATUS, CONTROL METHOD THEREOF AND STORAGE MEDIUM

BACKGROUND OF THE INVENTION

1. Field of the Invention

The present invention relates to an image forming apparatus, control method thereof, and storage medium.

2. Description of the Related Art

Conventionally, in an image forming apparatus which reads an original document to generate image data, and prints an image on paper based on the image data, an original document conveyance path for conveying an original document, and a conveyance path for conveying a printing material such as print paper are configured independently. While reading an original document, the image forming apparatus executes processing of printing an image on a printing material.

In Japanese Patent Laid-Open No. 2000-185881, a reading unit is inserted in a printing material conveyance path extending from a sheet feeding unit to a discharge unit, thereby partially sharing the original document conveyance path and printing material conveyance path and downsizing the apparatus.

When the original document conveyance path and printing material conveyance path are partially shared to be able to convey an original document to a printing unit, after the reading unit reads an original document (printing material) to acquire image information of the original document, another image can be additionally printed on the original document.

However, both additional printing on an original document read by the reading unit and printing on another printing material are processes accompanying image formation (printing) by the printing unit. When conveying an original document and a printing material to be printed to the printing unit, they may collide with each other on the conveyance path to hinder the conveyance with each other unless conveyance control is performed appropriately.

SUMMARY OF THE INVENTION

The present invention has been made to solve the above problems. The present invention provides a technique of preventing a collision between an original document and a printing material on a conveyance path when an image forming apparatus executes both additional printing on the original document and printing on the printing material.

According to one aspect of the present invention, there is provided an image forming apparatus comprising: a reading unit configured to read an image of an original document; a printing unit configured to print an image; and a control unit configured to, after the reading unit performs reading processing to read the image of the original document, execute first printing processing to convey the original document and print the image on the original document by the printing unit, and second printing processing to convey a sheet from a sheet feeding unit and print the image read by the reading unit on the sheet by the printing unit, wherein in a case where the control unit executes both the first printing processing and the second printing processing, the control unit controls conveyance of the original document and the sheet so that a collision between the original document conveyed in the first printing processing and the sheet conveyed in the second printing processing does not occur.

According to another aspect of the present invention, there is provided a method of controlling an image forming apparatus, comprising: a control step of, after a reading unit configured to read an image of an original document performs reading processing to read the image of the original document, executing first printing processing to convey the original document and print the image on the original document by printing unit, and second printing processing to convey a sheet from a sheet feeding unit and print the image read by the reading unit on the sheet by the printing unit, wherein in the control step, in a case where both the first printing processing and the second printing processing are executed, conveyance of the original document and the sheet is controlled so that a collision between the original document conveyed in the first printing processing and the sheet conveyed in the second printing processing does not occur.

The present invention can provide a technique of preventing a collision between an original document and a printing material on a conveyance path when an image forming apparatus executes both additional printing on the original document and printing on the printing material.

Further features of the present invention will become apparent from the following description of exemplary embodiments (with reference to the attached drawings).

BRIEF DESCRIPTION OF THE DRAWINGS

FIG. 3 is a view for explaining an operation at the start of reading the obverse surface of an original document in the MFP according to the first embodiment;

FIG. 4 is a view for explaining an operation at the end of reading the first surface serving as the obverse surface the original document in the MFP according to the first embodiment;

FIGS. 11A, 11B, and 11C are views for explaining conveyance of an original document and sheet when executing adding/copying processing in the MFP according to the first embodiment;

FIGS. 13A and 13B are flowcharts showing the sequence of processing to be executed in an MFP according to the second embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Image Forming Apparatus (MFP)

The first embodiment will describe an MFP (Multi Function Peripheral) having an image forming function and image reading function as an application example of an image forming apparatus according to the present invention. An image reading process and printing process in an MFP 1 will be explained with reference to FIGS. 1 to 9. The operation of the MFP 1 when the two sides of an original document G fed and conveyed from a second sheet feeding unit 90 are read and images read from the original document G are formed on the two sides of a sheet S fed and conveyed from a first sheet feeding unit 30 will be explained.

Figure 1:
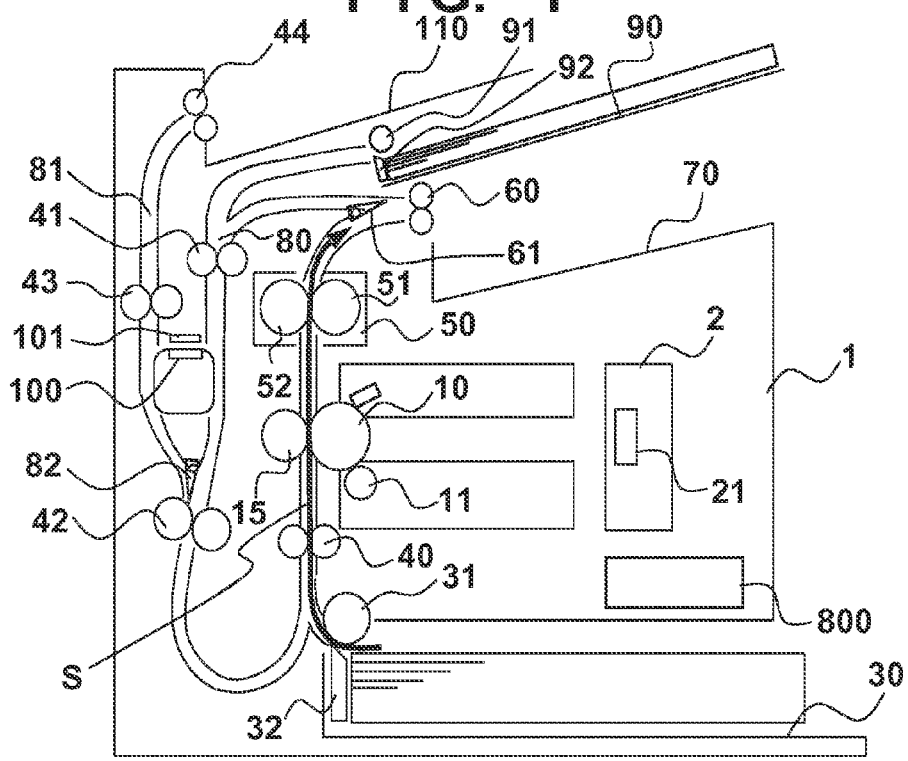
FIG. 1 is a schematic view showing the arrangement of an MFP according to the first embodiment.

An example of the arrangement of the MFP will be explained with reference to FIG. 1. A rotatable photosensitive drum 10 serving as an image carrier, and a development roller 11 which is juxtaposed with the photosensitive drum 10 and rotates while holding toner are arranged at the center of the MFP 1. Upon receiving a printing signal, a light emitting unit 21 of an optical unit 2 emits a laser beam to the surface of the rotating photosensitive drum 10. A latent image is formed by charges on the surface of the photosensitive drum 10 irradiated with the laser beam. While rotating, the development roller 11 supplies the held toner to the latent image on the surface of the photosensitive drum 10. Then, the toner image is formed on the surface of the photosensitive drum 10.

Sheets S stored in the first sheet feeding unit 30 are conveyed one by one by a CST pickup roller 31 and a separator 32 to conveyance rollers 40. The conveyance rollers 40 convey the sheet S to a transfer unit 15 so that the toner image on the surface of the photosensitive drum 10 and the leading end position of the sheet S coincide with each other. The sheet (printing material) is a medium on which the MFP 1 can print an image, and can include media of various materials such as paper and an OHP sheet.

The toner image conveyed to the transfer unit 15 by rotation of the photosensitive drum 10 is transferred to the sheet S by an application bias and pressure supplied to the transfer unit 15. Further, the transfer unit 15 conveys the sheet S to a fixing unit 50. In the fixing unit 50, the toner image is fixed on the sheet S by heat from a rotatable heat roller 51, and the pressure of a rotatable press roller 52 facing the heat roller 51. The sheet S on which the toner image is fixed is conveyed to discharge rollers 60. For single-sided printing, the discharge rollers 60 discharge the sheet S from the apparatus, and the sheet S is stacked on a first discharge unit 70. An electric unit 800 to be described later with reference to FIG. 8 controls the respective components of the MFP 1. Note that a conveyance path through which a sheet fed and conveyed from the first sheet feeding unit 30 is printed and discharged to the first discharge unit 70 will be called the first conveyance path.

Figure 2:
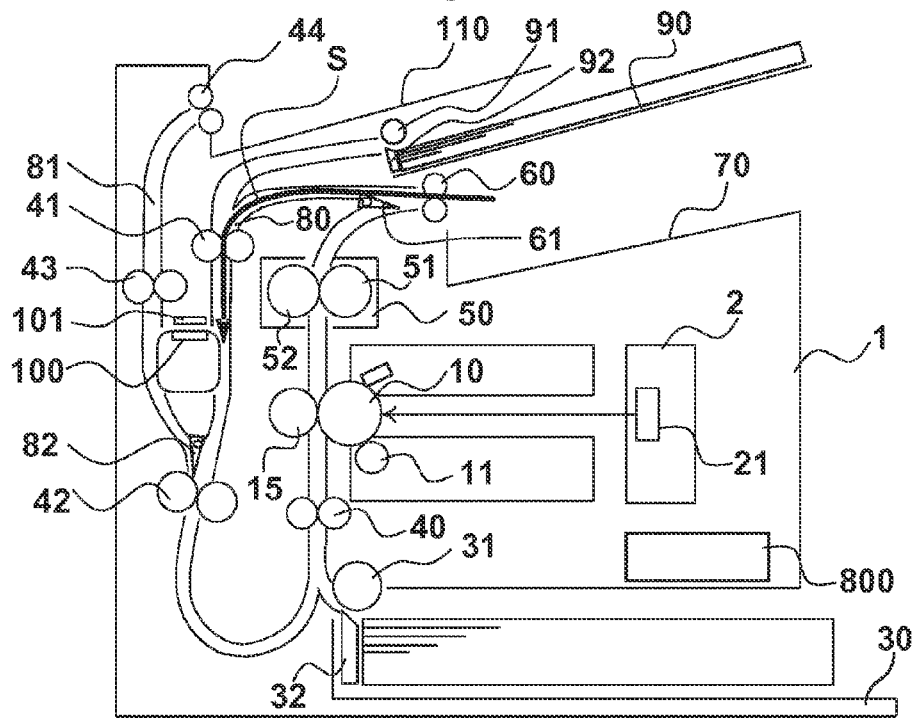
FIG. 2 is a view for explaining a double-sided printing process in the MFP according to the first embodiment.

Next, a double-sided printing process will be explained with reference to FIG. 2. A double-sided flapper 61 switches the conveyance path after the trailing end of the sheet S passes through it. Then, the discharge rollers 60 rotate reversely to convey the sheet S to a double-sided conveyance path (second conveyance path) 80. The switched-back sheet S is conveyed to an image reading unit 100 via conveyance rollers 41. As shown in FIG. 2, the image reading unit 100 is arranged near the double-sided conveyance path 80. Then, the sheet S is conveyed to conveyance rollers 42 and the conveyance rollers 40, and conveyed again to the transfer unit 15. A toner image is transferred to the reverse surfaces (surface different from the transfer surface described with reference to FIG. 1) of the sheet S, and fixed. After that, the sheet S is stacked on the first discharge unit 70.

A process to read original document information and execute double-sided printing on a sheet will be explained with reference to FIGS. 3 to 7. First, an operation at the start of reading the first surface serving as the obverse surface of an original document will be explained with reference to FIG. 3. The original documents G stored in the second sheet feeding unit 90 are conveyed one by one by a CIS pickup roller 91 and separator 92 to the conveyance rollers 41. The image reading unit 100 executes emission to a white reference member 101 and correction of the white reference value till the start of reading the first surface serving as the obverse surface of the original document G fed from the second sheet feeding unit 90. Then, the image reading unit 100 rotates to a position (position shown in FIG. 3) where the image reading unit 100 faces the double-sided conveyance path 80. That is, the image reading unit 100 rotates to a position where it reads the image of the original document G conveyed through the double-sided conveyance path 80. The conveyance rollers 41 convey the original document G to the image reading unit 100. The image reading unit 100 already stands by at the position where it faces the double-sided conveyance path 80. Information read by the image reading unit 100 is stored as information of the first surface of the original document in an image memory 804 to be described later with reference to FIG. 8. Note that the white reference member 101 faces down to prevent attachment of dust.

Next, an operation at the end of reading the first surface serving as the obverse surface of an original document will be explained with reference to FIG. 4. The original document G having passed through the image reading unit 100 is conveyed to the conveyance rollers 42. The conveyance rollers 42 stop after the trailing end of the original document G passes through a switchback flapper 82. The original document G stops while being clamped by the conveyance rollers 42. After the lapse of a predetermined time, the conveyance rollers 42 rotate reversely to convey the original document G to an original document conveyance path (third conveyance path) 81. At this time, it is also possible to convey the original document G to the conveyance rollers 40 without stopping it at the conveyance rollers 42, read the first surface, and then supply it to the image forming process described with reference to FIG. 1.

Next, an operation at the start of reading the second surface serving as a surface reverse to the first surface will be explained with reference to FIG. 5. Simultaneously when the switchback flapper 82 switches the conveyance path from the double-sided conveyance path 80 to the original document conveyance path 81, the image reading unit 100 rotates to the position where it faces the original document conveyance path 81. That is, the image reading unit 100 rotates to a position where it reads the image of a sheet conveyed through the original document conveyance path 81. When the conveyance rollers 42 rotate reversely, the original document G is conveyed to the image reading unit 100 along the original document conveyance path 81. When the original document G is conveyed to the image reading unit 100 and passes through it, information of the second surface serving as the reverse surface of the original document is read and stored as information of the second surface of the original document in the image memory 804. In this manner, the image reading unit 100 is interposed between the double-sided conveyance path 80 and the original document conveyance path 81, and is freely movable to read the images of sheets conveyed through these two conveyance paths.

After the start of reading of the second surface of the original document G, the sheets S fed from the first sheet feeding unit 30 are conveyed one by one to the conveyance rollers 40. At almost the same time, a latent image is formed on the photosensitive drum 10 in accordance with the previous image information by the light emitting unit 21 based on the read image of the second surface serving as the reverse surface of the original document that is stored in the image memory 804. After the transfer unit 15 transfers, to the sheet S, a toner image formed based on the latent image, the sheet S is conveyed to the fixing unit 50, completing image formation of the second surface of the original document. In FIG. 5, feeding of the sheet S starts at the same time as the start of reading information of the second surface serving as the reverse surface of the original document. However, the sheet S may be conveyed after reading information of the second surface.

Next, an operation at the end of reading the reverse surface of the original document will be explained with reference to FIG. 6. The original document G having undergone image reading is conveyed to conveyance rollers 43 and 44, and stacked on a second discharge unit 110. By using a sensor (not shown) arranged before the switchback flapper in the conveyance direction, the switchback flapper 82 detects that the trailing end of the original document G has passed. The conveyance path is then switched from the original document conveyance path 81 to the double-sided conveyance path 80 to convey, toward the conveyance rollers 40, the sheet S for which double-sided printing has started. The discharge rollers 60 reversely rotate to convey, toward the double-sided conveyance path 80 switched by the double-sided flapper 61, the sheet S having undergone image formation of the second surface read from the original document G, in order to form an image on the reverse surface (first surface). At this time, the sheet S is not conveyed to the double-sided conveyance path 80. Instead, the original document G is stopped at the conveyance rollers 44, and the conveyance rollers 44 rotate reversely to return the original document G to the original document conveyance path 81. Then, the original document G passes through the conveyance rollers 43 and 42, and is conveyed to the conveyance rollers 40. Image formation can therefore be performed on the original document G having undergone double-sided reading.

Next, an operation upon completion of image formation on the sheet S will be explained with reference to FIG. 7. The sheet S conveyed to the double-sided conveyance path 80 passes through the reversed image reading unit 100, and is conveyed to the conveyance rollers 40 via the conveyance rollers 42. Further, the sheet S is conveyed again to the transfer unit 15, as indicated by a broken line. Since image formation of the second surface of the original document on the sheet S has already ended, the image of the first surface of the original document is formed based on the image information of the first surface of the original document stored in the image memory 804. More specifically, a toner image is transferred to and fixed on the sheet S by an image forming unit formed from the optical unit 2, photosensitive drum 10, development roller 11, transfer unit 15, and fixing unit 50. Thereafter, the sheet S is discharged and stacked on the first discharge unit 70.

As described above, the conveyance path for the original document G and the conveyance path for the sheet S are partially shared in the MFP 1 according to the first embodiment. More specifically, a conveyance path for reading the first surface of the original document G, and a conveyance path for performing double-sided printing on the sheet S are shared. Also, a conveyance path for discharging the original document G after reading (to the first discharge unit 70), and a conveyance path for printing on the sheet S are shared. The conveyance path for discharging the original document G after reading (to the first discharge unit 70) can also be used to print on the original document G. In this way, the embodiment can downsize the apparatus.

<Control Unit of MFP>

Figure 8:
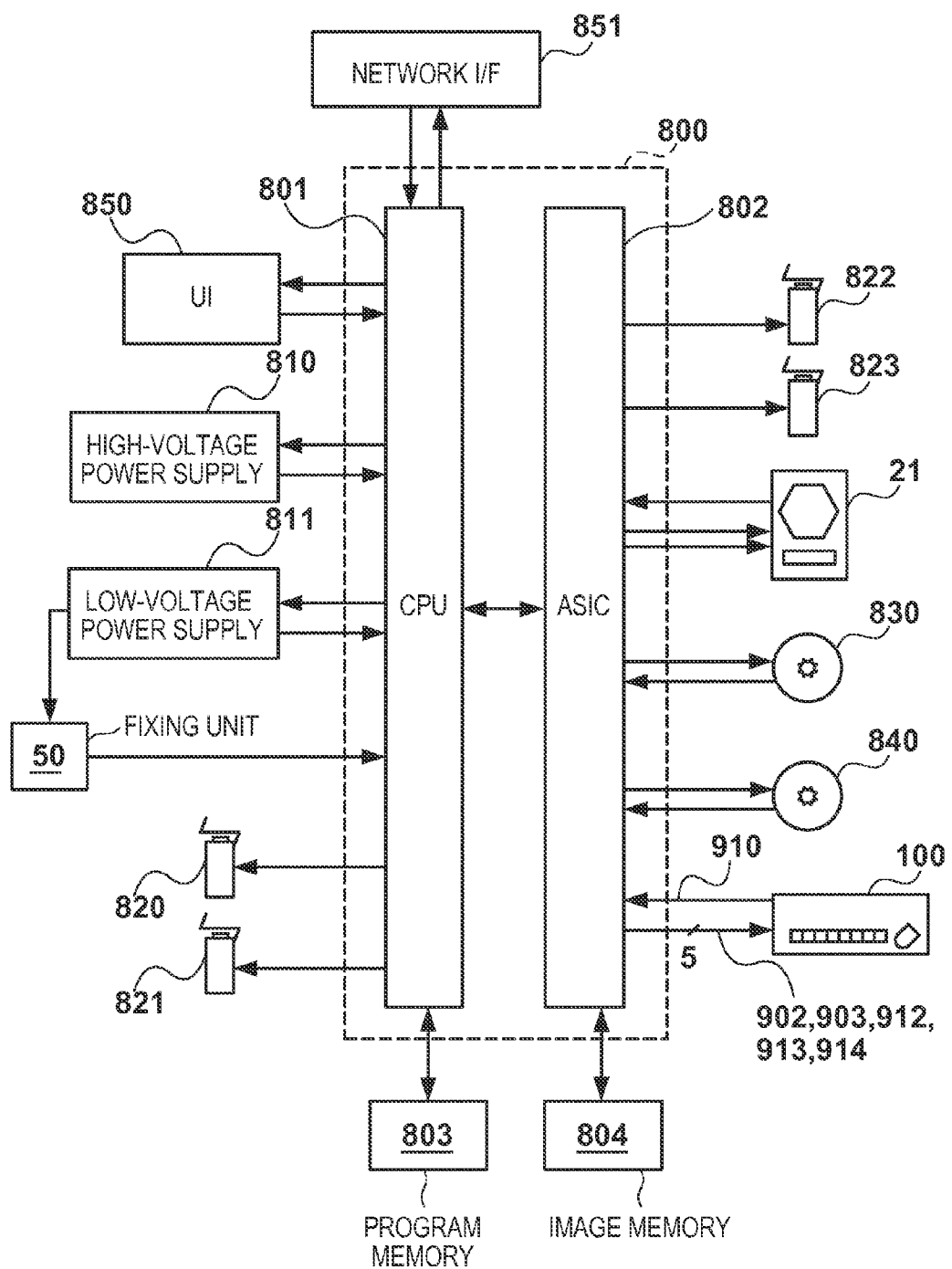
FIG. 8 is a view for explaining the operation of a control CPU in the MFP according to the first embodiment.

The operations of a control CPU 801 and ASIC 802 in an image forming operation according to the first embodiment will be described with reference to FIG. 8. FIG. 8 shows the arrangement of respective units to be controlled by the control CPU 801. As shown in FIG. 8, the control CPU 801 is connected via the ASIC 802 to the light emitting unit 21 including a polygon mirror, motor, laser emitting element, and the like. The control CPU 801 outputs a control signal to the ASIC 802 to control the optical unit 2 in order to form a desired latent image by scanning the surface of the photosensitive drum 10 with a laser beam. Similarly, the control CPU 801 controls a driving system including the CST pickup roller 31, conveyance rollers 40, photosensitive drum 10, and transfer unit 15 in order to convey the sheet S. The control CPU 801 also controls a driving system including a main motor 830 for driving the heat roller 51 and press roller 52, and a CST sheet feeding solenoid 822 which is turned on at the start of driving a sheet feed roller for feeding the sheet S, and drives the CST pickup roller 31. The control CPU 801 controls a driving system including a double-sided driving motor 840 for driving the CIS pickup roller 91 and the conveyance rollers 41 to 44.

Further, the control CPU 801 controls a high-voltage power supply 810 which controls a primary charge bias, development bias, primary transfer bias, and secondary transfer bias necessary for an electrophotographic process, the fixing unit 50, and a low-voltage power supply 811. The control CPU 801 monitors a temperature by using a thermistor (not shown) arranged in the fixing unit 50, and controls to keep the fixing temperature constant. The control CPU 801 is connected to a program memory 803 via a bus (not shown) or the like. The program memory 803 stores programs and data for executing all or some processes to be performed by the control CPU 801 in the above-described control and embodiments described in this specification. That is, the control CPU 801 executes operations according to embodiments of the present invention by using programs and data stored in the program memory 803.

The control CPU 801 receives, from a user interface (UI) 850, a signal representing an instruction input by the user via the UI 850. The control CPU 801 receives signals such as a print control command via a network interface (I/F) 851 from an external apparatus such as a network-connected host computer (not shown). The control CPU 801 performs various control operations described above based on signals received from the UI 850 and signals received via the network I/F.

The ASIC 802 performs speed control of the internal motor of the light emitting unit 21 and speed control of the main motor 830 and double-sided driving motor 840 based on instructions from the control CPU 801. In the motor speed control, a tachometer signal (pulse signal output from a motor every time the motor rotates) from a motor (not shown) is detected, and an acceleration or deceleration signal is output to the motor so that the interval between detected tachometer signals becomes a predetermined time. The control circuit formed from the hardware circuit of the ASIC 802 can reduce the control load on the control CPU 801.

The control CPU 801 starts the image forming operation in accordance with an instruction from the user via the UI 850 or upon receiving a print control command via the network I/F 851. More specifically, first, the control CPU 801 conveys the sheet S by driving the main motor 830, double-sided driving motor 840, and CST sheet feeding solenoid 822. The transfer unit 15 transfers, to the sheet S, a toner image formed on the surface of the photosensitive drum 10, and the fixing unit 50 fixes the toner image. Then, the sheet S is discharged by the discharge rollers 60 to the first discharge unit 70 serving as a sheet stacking unit. To improve alignment of image-formed sheets, the first discharge unit 70 has a gentle up slope formed from the vicinity of the discharge port in the sheet discharge direction. The control CPU 801 supplies predetermined power to the fixing unit 50 via the low-voltage power supply 811 to generate a desired amount of heat and supply the heat to the sheet S, thereby fusing and fixing the toner image on the sheet S.

An original document reading operation will be explained. The control CPU 801 starts the original document reading operation in accordance with an instruction from the user via the UI 850 or upon receiving a scan control command via the network I/F 851. More specifically, first, the control CPU 801 drives a double-sided flapper solenoid 820 and the double-sided driving motor 840. Further, the control CPU 801 operates an original document feeding flapper solenoid 823 to transmit the torque of the double-sided driving motor 840 to the CIS pickup roller 91 and convey the original document G. The image reading unit 100 is connected to the ASIC 802 via a signal line capable of transmitting various control signals CISLED, CISSTART, SYSCLK, Sl_in, Sl_select, and Sl_out (to be described later). The control CPU 801 saves, in the image memory 804 connected to the ASIC 802, an image obtained by reading by the image reading unit 100 in various control operations via the ASIC 802. After that, the control CPU 801 operates a switchback solenoid 821 to switch the switchback flapper 82 to the original document conveyance path 81, reversely rotate the double-sided driving motor 840, and convey the original document G to the second discharge unit 110.

<Image Reading Unit of MFP>

Figure 9:
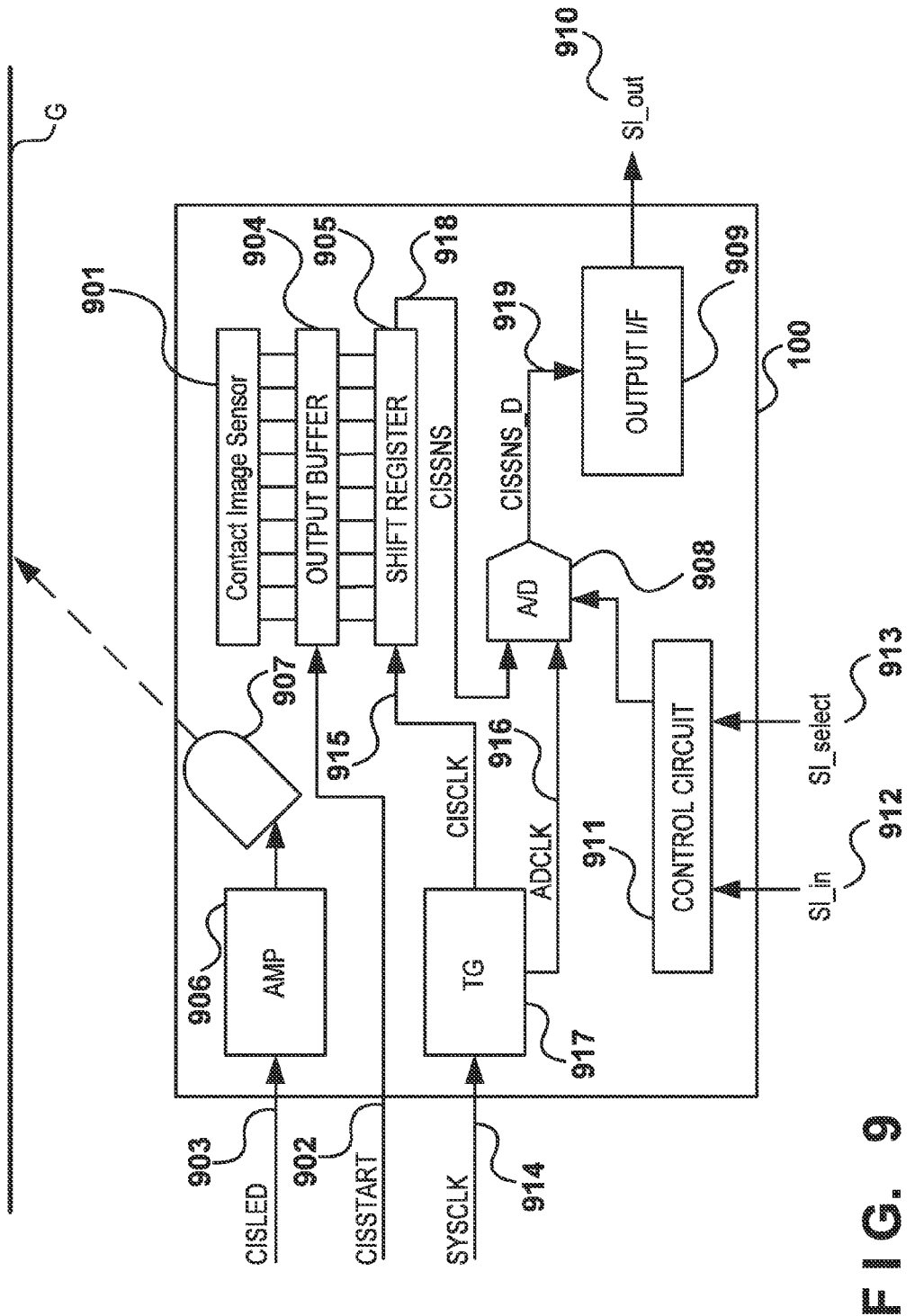
FIG. 9 is a view showing the arrangement of an image reading unit in the MFP according to the first embodiment.

Details of the image reading unit 100 will be described with reference to FIG. 9. FIG. 9 is a circuit block diagram of a CIS (Contact Image Sensor) sensor. In a contact image sensor 901, photodiodes for 10,368 pixels are arrayed at a specific main scanning density (for example, 1,200 dpi). A start pulse CISSTART signal 902 and transfer clock CISCLK 915 are supplied to the CIS sensor. A system clock SYSCLK 914 determines the operating speed of the CIS sensor. Reference numeral 908 denotes an A/D converter. A CIS sampling clock ADCLK 916 decides the sampling rate of the A/D converter 908. Reference numeral 917 denotes a timing generator; 904, an output buffer; 905, a shift register; 903, a light emitting element control signal CISLED; and 906, a current amplifier. A light emitting element 907 uniformly irradiates the original document G.

Subsequently, the operation of the image reading unit 100 will be explained. When the CISSTART signal 902 becomes active, the CIS sensor 901 starts accumulating charges based on received light, and sequentially sets data in the output buffer 904. Then, the transfer clock CISCLK 915 (for example, about 500 kHz to 1 MHz) is supplied, and the shift register 905 transfers the data set in the output buffer 904 as a CISSNS signal 918 to the A/D converter 908. The CISSNS signal 918 has a predetermined data assurance area, and thus needs to be sampled a predetermined time after the leading edge of the transfer clock CISCLK 915. The CISSNS signal 918 is output in synchronism with both the leading and trailing edges of the transfer clock CISCLK 915. Hence, the frequency of the CIS sampling clock ADCLK 916 is generated to be double the transfer clock CISCLK 915. The CISSNS signal 918 is sampled at the leading edge of the CIS sampling clock ADCLK 916.

The timing generator 917 divides the frequency of the system clock SYSCLK 914, generating the CIS sampling clock ADCLK 916 and transfer clock CISCLK 915. The phase of the CIS sampling clock ADCLK 916 is delayed from that of the transfer clock CISCLK 915 by the data assurance area.

The CISSNS signal 918 converted into a digital signal by the A/D converter 908 is output as a CISSNS_D signal 919 to an output interface circuit 909. The CISSNS_D signal 919 is controlled at a predetermined timing by the output interface circuit 909, and output as serial data by an Sl_out signal 910. At this time, an analog output reference voltage is output for the CISSNS signal 918 corresponding to a predetermined number of pixels from the start pulse (CISSTART signal) 902, and these pixels cannot be used as effective pixels.

A control circuit 911 can variably control the A/D conversion gain of the A/D converter 908 in accordance with an Sl_in signal 912 and Sl_select signal 913. For example, when the contrast of a captured image cannot be obtained, the control CPU 801 increases the A/D conversion gain of the A/D converter 908 to increase the contrast, and an image can always be captured with a best contrast.

A system in which all pixels are output as one output CISSNS signal 918 has been described. However, pixels may be divided into respective areas for high-speed reading, and A/D conversion may be performed simultaneously in a plurality of areas. In the above description, the image reading unit 100 uses the CIS sensor. However, the present invention is not limited to this, and a CMOS sensor, CCD sensor, or the like is also applicable.

<Adding/Copying Processing in MFP>

Figure 10:
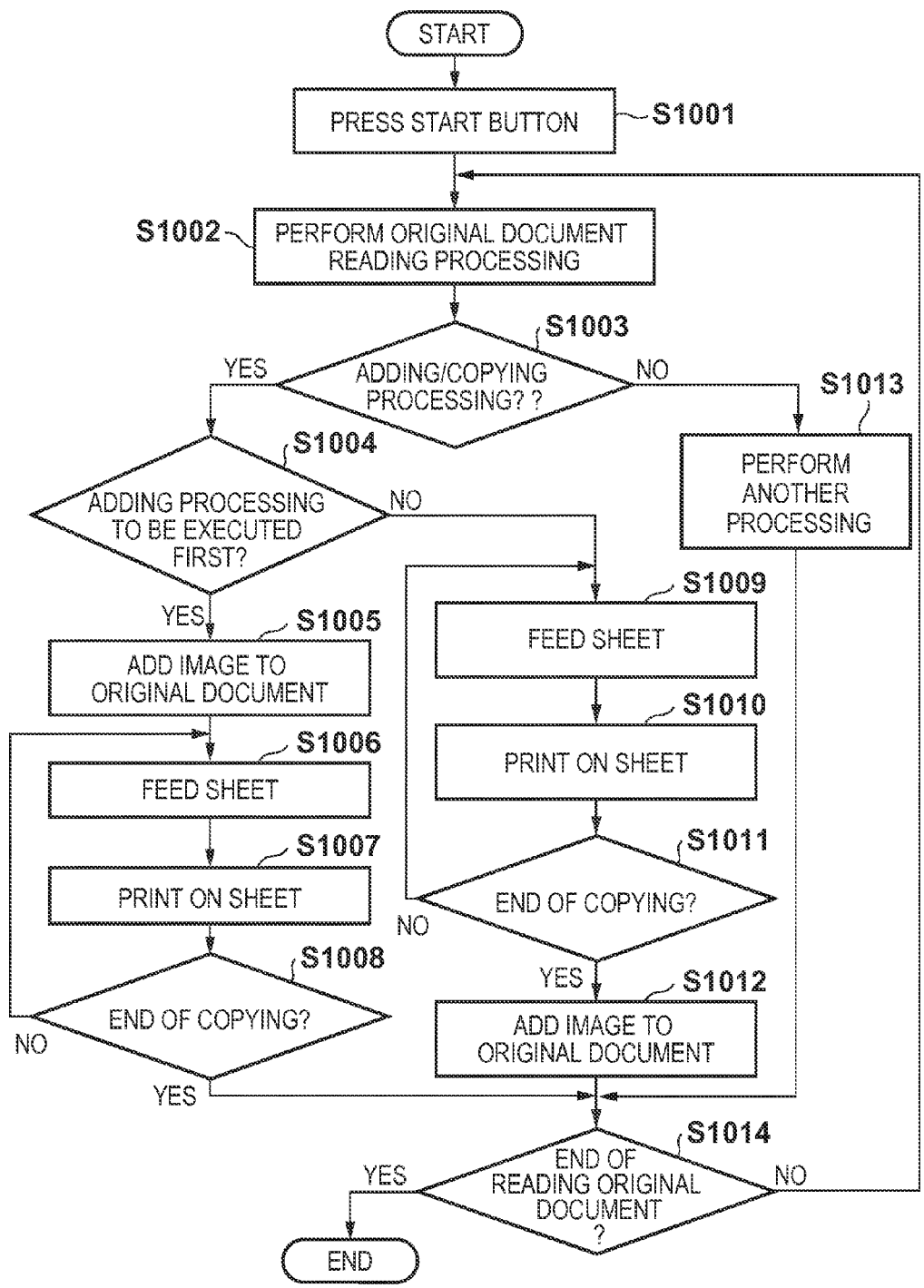
FIG. 10 is a flowchart showing the sequence of processing to be executed in the MFP according to the first embodiment.

The sequence of adding/copying processing to be executed by the MFP 1 according to the first embodiment will be described with reference to FIG. 10. Processing to be described below is implemented in the MFP 1 when the control CPU 801 reads out and executes a program stored in the program memory 803. Respective processes shown in FIG. 10 will be explained by appropriately referring to 11*a* to 11*f* shown in FIGS. 11A to 11C.

First, if the control CPU 801 detects in step S1001 that the user has pressed a start button (not shown) arranged in the UI 850, it starts processing corresponding to processing contents set by the user via the UI 850. The processing contents set by the user can include "copying processing" of copying an image read from an original document onto a sheet, and "reading processing" of outputting image data corresponding to an image read from an original document. Further, the processing contents set by the user can include "adding processing" of printing an image to be added on an original document, and "adding/copying processing" of executing both adding processing and copying processing by using a fed original document. For example, when the user wants to add a date to the original document G and obtain a copy of the original document G, he designates, via the UI 850, date adding processing and copying processing of the original document G as processing contents to be executed. As will be described later, when the user designates only copying processing of the original document G, adding processing may be automatically executed in accordance with the original document G in addition to the copying processing.

Then, in step S1002, the control CPU 801 performs original document reading processing. The control CPU 801 operates the CIS pickup roller 91 to feed the original document G from the second sheet feeding unit 90 to the double-sided conveyance path 80, and starts conveyance. The control CPU 801 operates the conveyance rollers 41 to convey the original document G to the image reading unit 100. Further, the control CPU 801 controls the image reading unit 100 to read the original document G, and saves image data corresponding to the read image in the image memory 804. After that, the control CPU 801 conveys the original document G having passed through the image reading unit 100 by the conveyance rollers 42. As shown in FIG. 4, when the trailing end of the original document G passes through the switchback flapper 82, the control CPU 801 stops the conveyance rollers 42.

In step S1003, the control CPU 801 determines whether the processing contents to be executed represent adding/copying processing. This can be determined based on the processing contents set via the UI 850 in step S1001. If the control CPU 801 determines in step S1003 that the processing contents to be executed represent adding/copying processing, it advances the process to step S1004; if the control CPU 801 determines that the processing contents to be executed do not represent adding/copying processing, to step S1013.

The determination in step S1003 may be automatically executed based on image data which is saved in the image memory 804 and corresponds to the original document image. For example, assume that there is a workflow which needs to execute adding printing of a barcode or date on a form and copying of the form after handwriting input on the form. In this case, even if the user designates only copying processing in step S1001 via the UI 850, when an original document image corresponding to image data saved in the image memory 804 is a specific form, the control CPU 801 determines to execute adding/copying processing. In this case, the control CPU 801 executes adding processing by using settings associated in advance with the specific form. In step S1003, the control CPU 801 suffices to determine whether the original document image is a specific form, by using a form recognition technique such as pattern matching or OCR. If the control CPU 801 determines that the original document image is not a specific form, it determines that the processing contents to be executed do not represent adding/copying processing.

If the control CPU 801 advances the process from step S1003 to step S1004, it determines in step S1004 which of copying processing and adding processing should be executed first for the original document G (in this case, whether adding processing should be executed first). That is, the control CPU 801 determines which of copying processing and adding processing for the original document G should be prioritized.

In adding/copying processing, copying processing for the sheet S is executed together with adding processing for the original document G. In the adding processing for the original document G, the original document G is read and then conveyed to the transfer unit 15, and the transfer unit 15 prints an image to be added on the original document G. In copying processing for the original document G, after the original document G is read, the sheet S is conveyed to the transfer unit 15, and the transfer unit 15 copies (prints) the image read from the original document G on the sheet S. The adding processing and copying processing commonly use the first conveyance path to convey the original document G and sheet S to the transfer unit 15. In adding/copying processing, therefore, the original document G and sheet S may collide with each other on the conveyance path unless the timings to convey the original document G and sheet S to the transfer unit 15 on the conveyance path are controlled appropriately.

The embodiment assumes that which of adding processing (first printing processing) and copying processing (second printing processing) should be executed first (should be prioritized) in adding/copying processing is set in advance depending on the form of the conveyance path in the MFP 1. Alternatively, in step S1001, the user may set it via the UI 850. In accordance with this setting, the control CPU 801 executes the determination in step S1003. If the control CPU 801 determines in step S1003 to execute adding processing first, it advances the process to step S1005; if it determines not to execute adding processing first (that is, to execute copying processing first), to step S1009. In this fashion, the execution order of adding processing and copying processing can be appropriately controlled in accordance with the form of the conveyance path of the MFP 1. These processes can be executed in an order suited to the apparatus arrangement of the MFP 1. Alternatively, the execution order of these processes can be controlled in accordance with user's need, improving user friendliness.

In step S1004, which of adding processing and copying processing should be executed first in adding/copying processing may not only be set in advance, but also be decided based on the prediction result of the total processing time of these two processes. That is, the total processing time taken to execute adding processing first, and the total processing time taken to execute copying processing first are predicted, and which of the processes is to be executed first is decided so as to shorten the total processing time. Thus, the waiting time of the user till the end of adding/copying processing can be minimized.

For example, assume that when executing adding/copying processing for a plurality of original documents G, the next original document G to be read stands by in the second sheet feeding unit 90, and it is predicted that the total processing time will be shortened by quickly freeing the double-sided conveyance path 80 and executing the next reading. In this case, adding processing is executed prior to copying processing (adding processing is prioritized). The original document G on the double-sided conveyance path 80 is conveyed quickly to the transfer unit 15 to free the double-sided conveyance path 80 and enable reading of the next original document G.

When conveyance of the sheet S to the transfer unit 15 takes time, the total processing time may be shortened by executing adding processing for the original document G prior to copying processing for the sheet S. Even in this case, adding processing is executed prior to copying processing. In contrast, when conveyance of the original document G to the transfer unit 15 takes time, the total processing time may be shortened by executing copying processing for the sheet S prior to adding processing for the original document G. In this case, copying processing is executed prior to adding processing.

The total processing time is predicted using, as constraint conditions, copying conditions (for example, copy count) set (designated) by the user via the UI 850, and the original document count. As a constraint condition, the time taken to generate an image to be added may be considered.

In this fashion, the control CPU 801 decides, as printing processing to be executed first, printing processing which shortens the total processing time, out of adding processing (first printing processing) and copying processing (second printing processing). The control CPU 801 starts execution of one decided printing processing, and after the original document G or sheet S is conveyed to the transfer unit 15 in the printing processing, starts execution of the other printing processing.

(Case in which Adding Processing is Executed First)

Figure 11A:
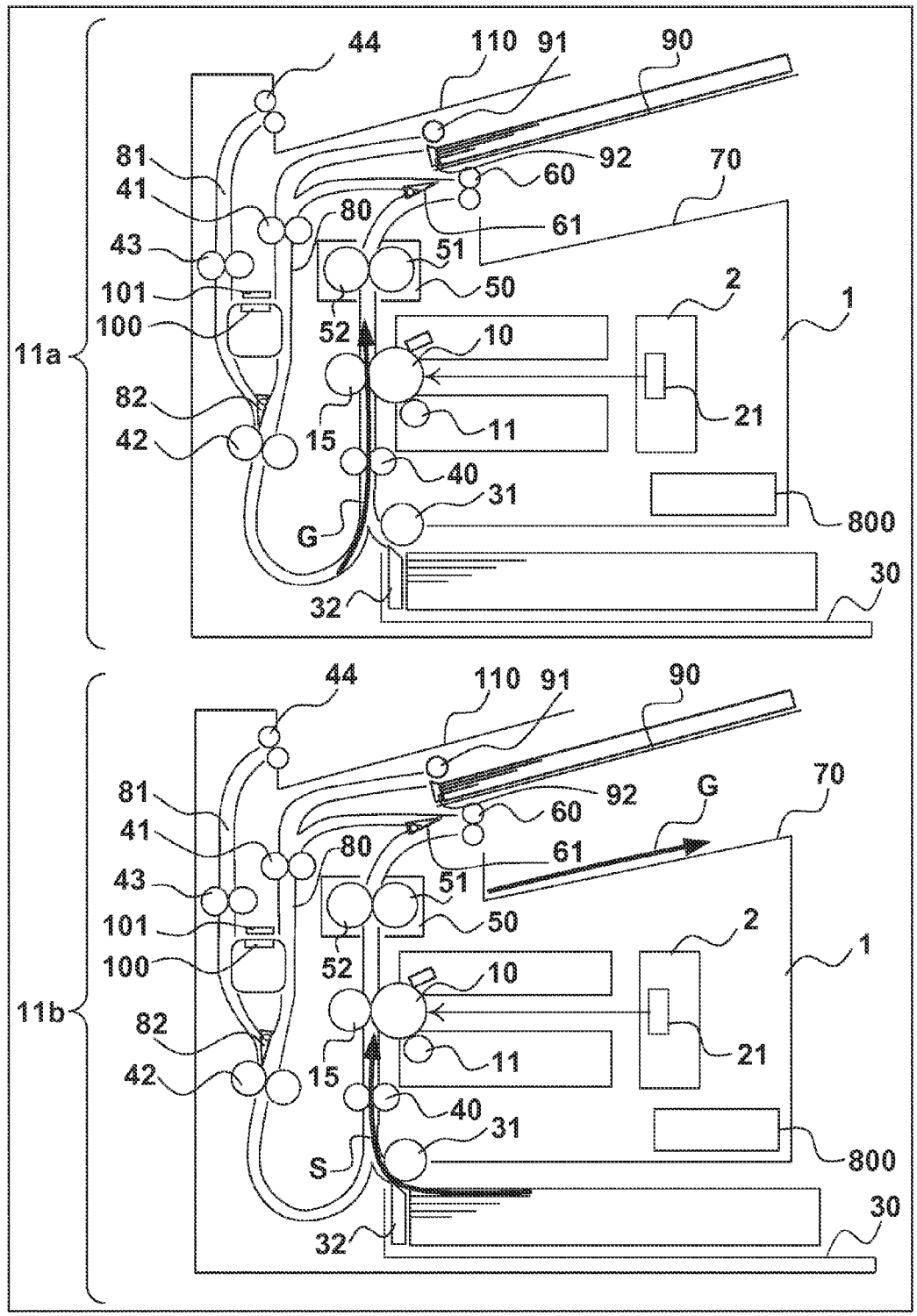

If the control CPU 801 advances the process from step S1004 to step S1005, it executes adding processing for the original document G prior to copying processing for the sheet S. The control CPU 801 conveys the original document G at rest to the transfer unit 15 by operating the conveyance rollers 42 and 40, as represented by 11a (FIG. 11A). The transfer unit 15 transfers an image to be added (toner image) to the conveyed original document G. The toner image to be transferred is a toner image to be added to the original document G. The control CPU 801 generates this toner image in the image memory 804 and renders it on the photosensitive drum 10.

The image to be added is, for example, an image for printing a date based on contents designated by the user via the UI 850, or an image for printing a form input item, barcode, or the like in accordance with image data of the original document G saved in the image memory 804. The position where the image is to be added on the original document G can be appropriately adjusted in accordance with image data of the original document G saved in the image memory 804. For example, when the image of the original document G contains an original document object such as a frame or logotype indicating a prospective adding portion, it is only necessary that the adding position is adjusted in accordance with the position of the original document object, and the control CPU 801 generates an image to be added at the adding position.

After the end of transfer by the transfer unit 15, the control CPU 801 conveys the original document G to the fixing unit 50 to fix the toner image on the original document G. The control CPU 801 conveys the toner image-fixed original document G by the discharge rollers 60, and discharges the original document G to the first discharge unit 70.

In step S1006, after the original document G is conveyed to the transfer unit 15, the control CPU 801 feeds the sheet S from the first sheet feeding unit 30 to the conveyance path in order to execute copying (printing) processing for the sheet S. For example, the control CPU 801 feeds the sheet S from the first sheet feeding unit 30 to the conveyance path a predetermined time after the start of conveying the original document G to the transfer unit 15. The predetermined time is defined as the time to prevent a collision between the original document G and the sheet S on the conveyance path. In this case, adding processing for the original document G has already been executed, the original document G has been discharged to the first discharge unit 70, and the original document G does not exist on the conveyance path of the sheet S. Thus, the sheet S can be conveyed without being hindered by the original document G on the conveyance path. The control CPU 801 operates the CST pickup roller 31 and separator 32 to feed, to the conveyance path, one sheet S stored in the first sheet feeding unit 30, and conveys the sheet S to the conveyance rollers 40, as represented by 11b (FIG. 11A).

After the sheet S is conveyed to the conveyance rollers 40, the control CPU 801 executes control for printing (copying) on the sheet S in step S1007. More specifically, the control CPU 801 operates the conveyance rollers 40 to convey the sheet S to the transfer unit 15. The transfer unit 15 transfers the toner image to the conveyed sheet S. The toner image to be transferred to the sheet S is a toner image for copying the image of the original document G to the sheet S. The control CPU 801 generates this toner image in the image memory 804 and renders it on the photosensitive drum 10.

First, the control CPU 801 generates image data corresponding to an image to be copied, by performing various image processes (for example, γ conversion processing and screen processing) for copying (printing) for image data in the image memory 804 that corresponds to the image of the original document G. At this time, the control CPU 801 may combine, with the image to be copied, an image to be added that has been generated in step S1005, and use the combined image as an image to be copied. Alternatively, an image to be copied that corresponds to the original document G may be directly used for copying without executing the combination. In this manner, in accordance with user's need, a copy on which the image to be copied, combined with the image to be added, as needed, is printed can be output.

Figure 11B:
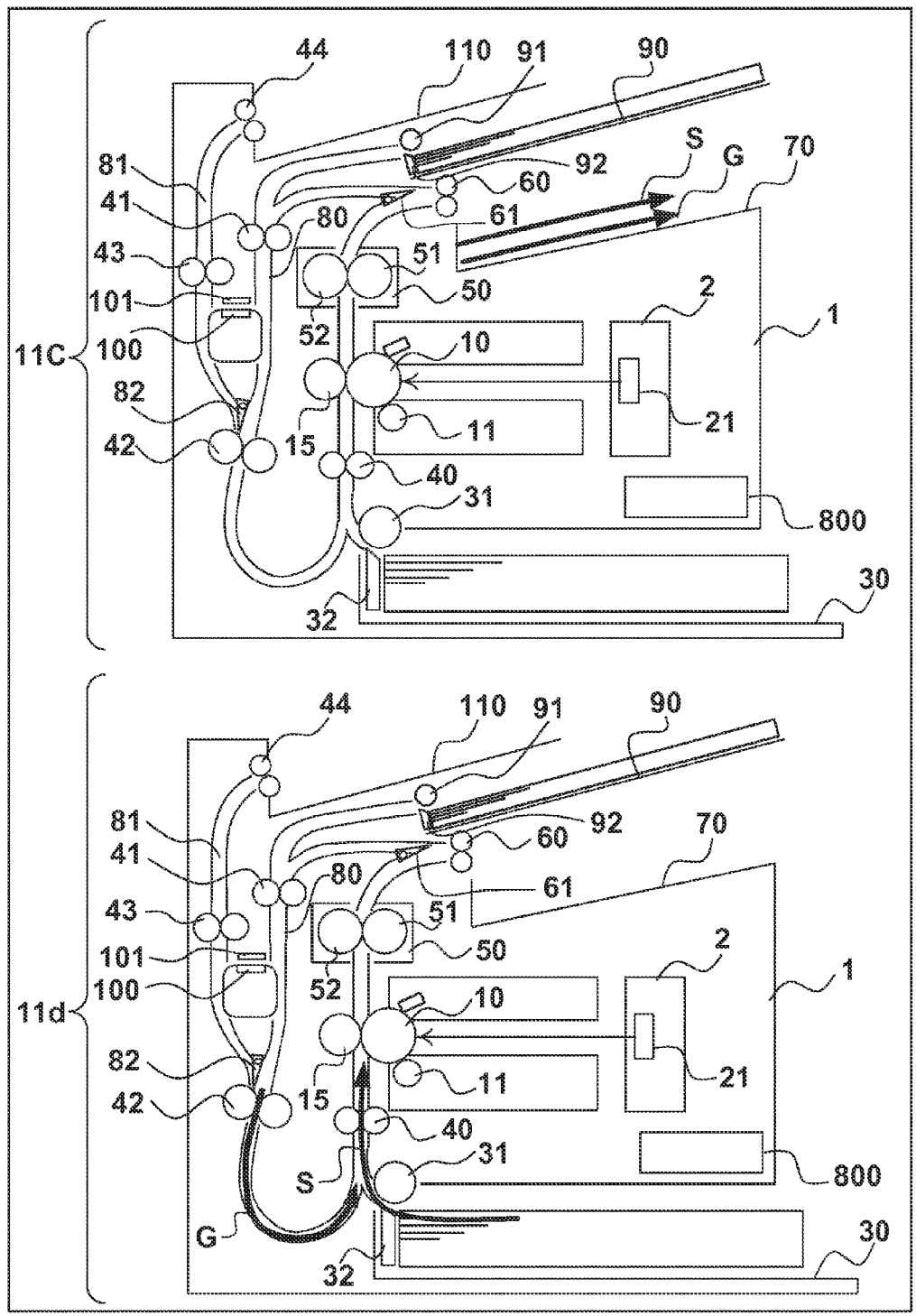

After the end of transfer by the transfer unit 15, the control CPU 801 conveys the sheet S to the fixing unit 50 to fix the toner image on the sheet S. The control CPU 801 conveys the toner image-fixed sheet S by the discharge rollers 60, and discharges the sheet S to the first discharge unit 70, as represented by 11c (FIG. 11B).

In step S1008, if a plurality of copies are designated via the UI 850, the control CPU 801 determines whether copying by the designated copy count has ended. If the control CPU 801 determines that copying by the designated copy count has ended, it advances the process to step S1014. If the control CPU 801 determines that copying by the designated copy count has not ended, it returns the process to step S1006 to repeat the processes in steps S1006 and S1007 till the end of copying by the designated copy count.

(Case in which Copying Processing is Executed First)

If the control CPU 801 advances the process from step S1004 to step S1009, it executes copying processing for the sheet S prior to adding processing for the original document G. While stopping the original document G, the control CPU 801 feeds one sheet S stored in the first sheet feeding unit 30 to the conveyance path by the same processing as that in step S1006, and conveys it to the conveyance rollers 40, as represented by 11d (FIG. 11B). The original document G stops before the conveyance rollers 40 on the conveyance path extending from the second sheet feeding unit 90 by the processing of step S1002. Thus, the original document G does not exist on the conveyance path through which the sheet S is conveyed from the first sheet feeding unit 30. The sheet S can be conveyed without being hindered by the original document G on the conveyance path.

In step S1010, the control CPU 801 executes control for printing (copying) on the sheet S. More specifically, similar to step S1007, the control CPU 801 operates the conveyance rollers 40 to convey the sheet S to the transfer unit 15, and controls the transfer unit 15 to transfer a toner image to be copied to the sheet S. Note that an image to be copied (toner image) may or may not be combined with an image to be added, similar to step S1007.

After the end of transfer by the transfer unit 15, the control CPU 801 conveys the sheet S to the fixing unit 50 to fix the toner image on the sheet S, similar to step S1007. Then, the sheet S is discharged to the first discharge unit 70. In step S1011, similar to step S1008, if a plurality of copies are designated via the UI 850, the control CPU 801 determines whether copying by the designated copy count has ended. If the control CPU 801 determines that copying by the designated copy count has ended, it advances the process to step S1012. If the control CPU 801 determines that copying by the designated copy count has not ended, it returns the process to step S1009 to repeat the processes in steps S1009 and S1010 till the end of copying by the designated copy count.

After the end of copying processing (after conveying the sheet S to the transfer unit 15 on the conveyance path), the control CPU 801 executes adding processing for the original document G in step S1012. The control CPU 801 conveys the original document G at rest to the transfer unit 15, similar to step S1005, as represented by 11e (FIG. 11C). Similar to step S1005, the transfer unit 15 transfers an image to be added (toner image) to the conveyed original document G. The toner image to be transferred is a toner image to be added to the original document G. The control CPU 801 generates this toner image in the image memory 804 and renders it on the photosensitive drum 10. At this time, the control CPU 801 generates an image to be added, similar to step S1005. If an image to be added has already been generated in step S1009 to combine it with the image to be copied, it is used.

After the end of transfer by the transfer unit 15, the control CPU 801 conveys the original document G to the fixing unit 50 to fix the toner image on the original document G, similar to step S1005. Then, the control CPU 801 conveys the toner image-fixed original document G by the discharge rollers 60, and discharges it to the first discharge unit 70, as represented by 11f (FIG. 11C). After the end of the processing in step S1012, the control CPU 801 advances the process to step S1014.

Steps S1005 and S1012 are examples of the first printing processing. Steps S1006, S1007, S1009, and S1010 are examples of the second printing processing.

(Case in which Processing Other than Adding/Copying Processing is Executed)

If the control CPU 801 advances the process from step S1003 to step S1013, it executes in step S1013 processing contents (another processing such as single copying processing, single adding processing, or single reading processing) to be executed that have been set in step S1001, other than adding/copying processing. When executing such processing, both the original document G and sheet S need not be conveyed to the transfer unit 15, unlike the above-described adding/copying processing. That is, the original document G and sheet S do not hinder each other on the conveyance path extending to the transfer unit 15. In step S1013, therefore, the timings to convey the original document G and sheet S to the transfer unit 15 need not be controlled, and which of adding processing and copying processing is to be prioritized need not be decided, unlike the adding/copying processing. After the end of the processing in step S1013, the control CPU 801 advances the process to step S1014.

If the control CPU 801 advances the process from step S1008, S1012, or S1013 to step S1014, it determines, in step S1014 based on whether the original document G to be read exists (remains), whether to end reading of the original document G. In this case, by using an original document detection sensor (not shown) arranged near the CIS pickup roller 91, the control CPU 801 detects whether the original document G remains in the second sheet feeding unit 90. If the original document G remains in the second sheet feeding unit 90, the control CPU 801 determines not to end reading of the original document G, and returns the process to step S1002. If the original document G does not remain in the second sheet feeding unit 90, the control CPU 801 determines to end reading of the original document G, and ends the process.

As described above, in the MFP 1 according to the present embodiment, a conveyance path for performing printing such as copying on the sheet S is shared as a conveyance path for performing additional printing (adding printing) on the original document G to be read. When the MFP 1 performs adding/copying processing to execute adding printing on the original document G after reading and copy an image read from the original document G on the sheet S, the sheet S is fed from the first sheet feeding unit 30 after the original document G is conveyed to the transfer unit 15. This can prevent a collision between the sheet S and the original document G on the conveyance path through which the sheet S and original document G are commonly conveyed.

The MFP 1 may perform copying on the sheet S prior to adding printing on the original document G. In this case, after the sheet S is conveyed to the transfer unit 15, conveyance of the original document G to the transfer unit 15 starts. This can prevent a collision between the sheet S and the original document G on the conveyance path through which the sheet S and original document G are commonly conveyed, similar to the above-mentioned case. The present embodiment can implement adding/copying processing without a collision between the original document G and the sheet S on the commonly used conveyance path.

Modification to First Embodiment

The above-described embodiment has explained a case in which one side of the original document G is read, adding printing is performed for this side, and the image of one side that has been read from the original document G is copied to one side of the sheet S. However, the present invention is not limited only to the single-sided processing. For example, the first embodiment can be modified to read the two sides of the original document G, perform adding printing for the two sides, and copy, on the two sides of the sheet S, the images of the two sides that have been read from the original document G.

Figure 12:
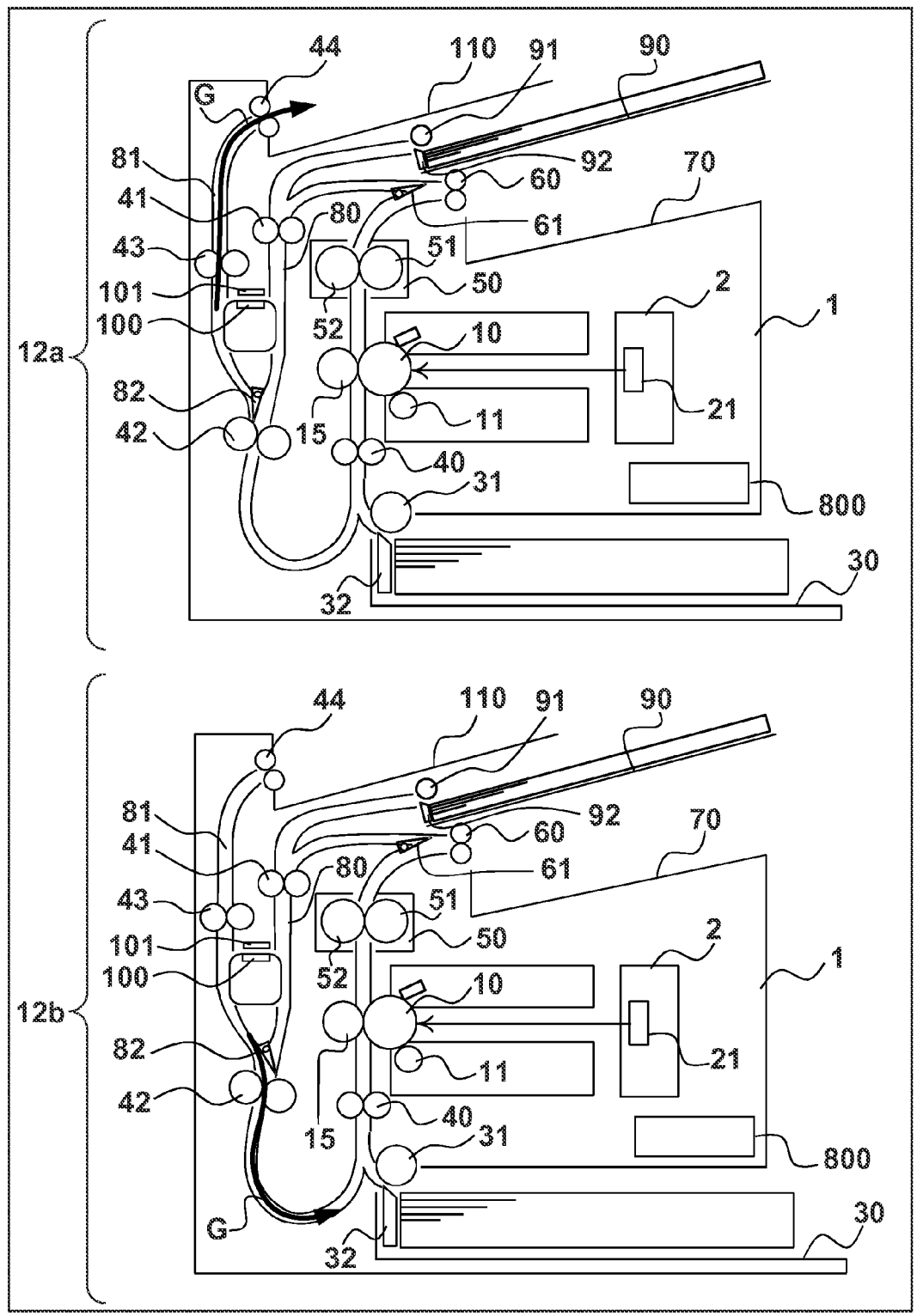
FIG. 12 is a view for explaining conveyance of an original document when executing double-sided adding/copying processing in the MFP according to the first embodiment.

This modification will be explained with reference to FIGS. 10 to 12. For example, the control CPU 801 executes reading processing for the two sides of the original document G in step S1002, and executes adding processing for the two sides of the original document G in steps S1005 and S1012. In steps S1007 and S1010, the control CPU 801 executes copying processing of images read from the two sides of the original document G on the two sides of the sheet S.

In double-sided reading processing (step S1002) for the original document G, while conveying the original document G, the image reading unit 100 reads the two sides of the original document G by using the processes described with reference to FIGS. 3, 4, and 5. After the end of reading the original document G by the image reading unit 100, the control CPU 801 stops the conveyance rollers 44 to stop the original document G on the original document conveyance path 81 without discharging the original document G to the second discharge unit 110, as represented by 12a (FIG. 12). This enables adding processing to the original document G.

Figure 5:
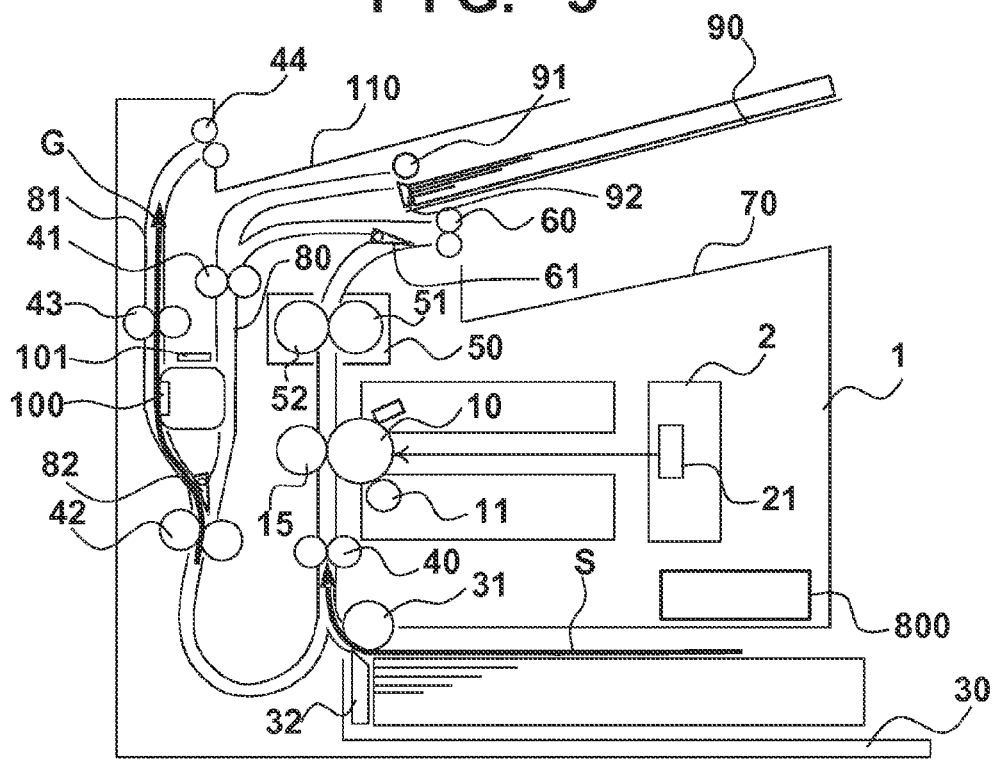
FIG. 5 is a view for explaining an operation at the start of reading the second surface serving as the reverse surface of the original document in the MFP according to the first embodiment.
Figure 6:
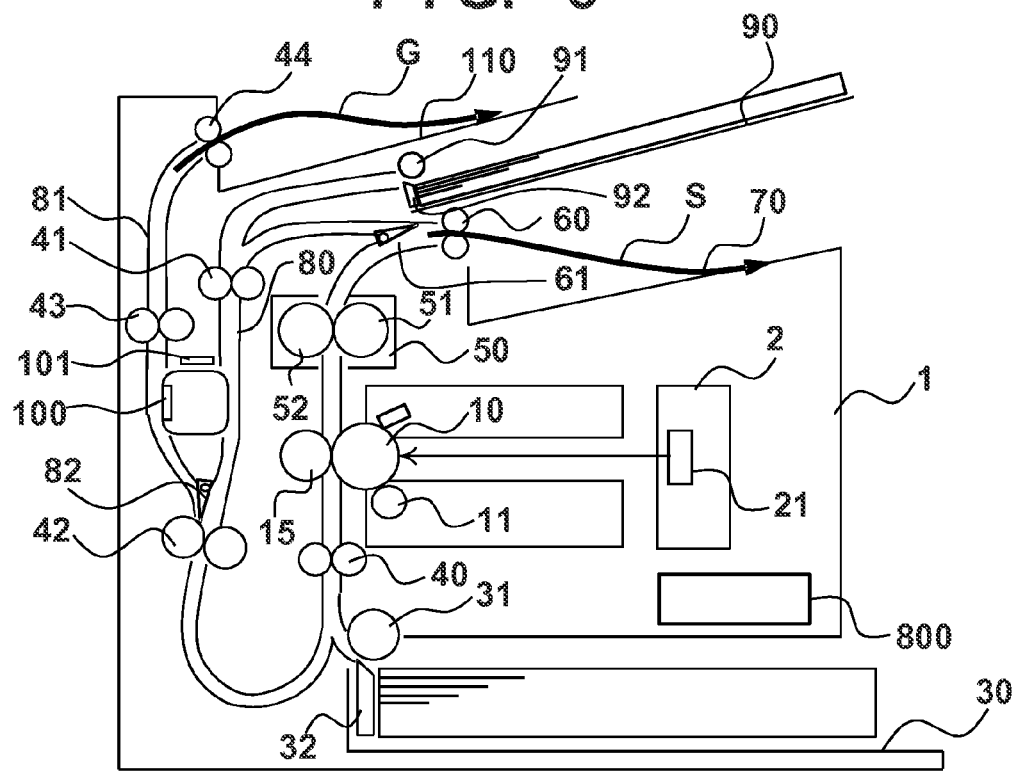
FIG. 6 is a view for explaining an operation at the end of reading the reverse surface of the original document in the MFP according to the first embodiment.
Figure 7:
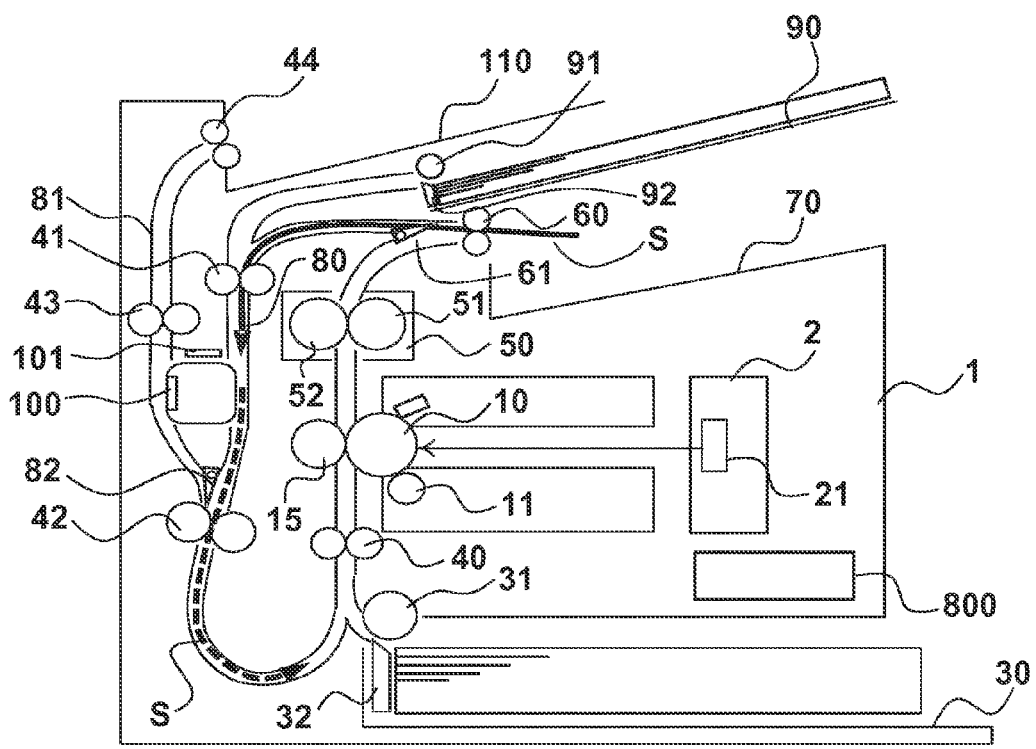
FIG. 7 is a view for explaining an operation upon completion of image formation on a sheet S in the MFP according to the first embodiment.

In double-sided adding processing and double-sided copying processing, the process for executing double-sided printing on the sheet S, which has been described with reference to FIGS. 5, 6, and 7, is used. However, when executing double-sided adding processing, printing (adding) is performed on the two sides of not the sheet S but the original document G. To achieve this, the control CPU 801 needs to convey, to the transfer unit 15, the original document G which has stopped on the original document conveyance path 81, and perform printing (adding). When the switchback flapper 82 has not been switched to the original document conveyance path 81, the control CPU 801 switches it, and operates the conveyance rollers 40, 42, 43, and 44, thereby conveying the original document G to the transfer unit 15, as represented by 12b (FIG. 12).

When executing double-sided adding/copying processing for the original document G and sheet S, the sheet S is also conveyed to the double-sided conveyance path 80. As a result, the sheet S also uses the conveyance path through which the original document G is conveyed from the second sheet feeding unit 90 to the transfer unit 15 via the conveyance rollers 42 and 40. However, the original document G stops on the original document conveyance path 81 in step S1002, unlike the above-described case in which single-sided adding/copying simultaneous processing is executed for the original document G and sheet S. Hence, when the sheet S is conveyed through the double-sided conveyance path 80, it does not collide with the original document G, and conveyance of the sheet S and that of the original document G do not hinder each other.

As described above, even when double-sided adding/copying processing is executed for the original document G and sheet S, the same advantages as those when single-sided adding/copying processing is executed can be obtained.

Second Embodiment

The first embodiment has explained a case in which, when executing adding/copying processing for a plurality of original documents G, the original documents G are processed one by one. In this case, the original documents G and sheets S are discharged (output) to the first discharge unit 70 by every original document. That is, the first image-added original document, a bundle of corresponding copied sheets, the second image-added original document, a bundle of corresponding copied sheets, . . . , the Nth image-added original document, and a bundle of corresponding copied sheets are output in the order named.

The second embodiment will explain adding/copying processing to which the present invention is applied when it is designated to sort and output image-added original documents and copied sheets. Sorting of original documents G and sheets S means sorting in the page order. More specifically, in the second embodiment, the first image-added original document, the second image-added original document, . . . , the Nth image-added original document are output, and then sheets are output in the following order: copied sheets (bundle) corresponding to the first original document, copied sheets (bundle) corresponding to the second original document, . . . , copied sheets (bundle) corresponding to the Nth original document. A difference from the first embodiment will be mainly explained to simplify the description.

Figure 13A:
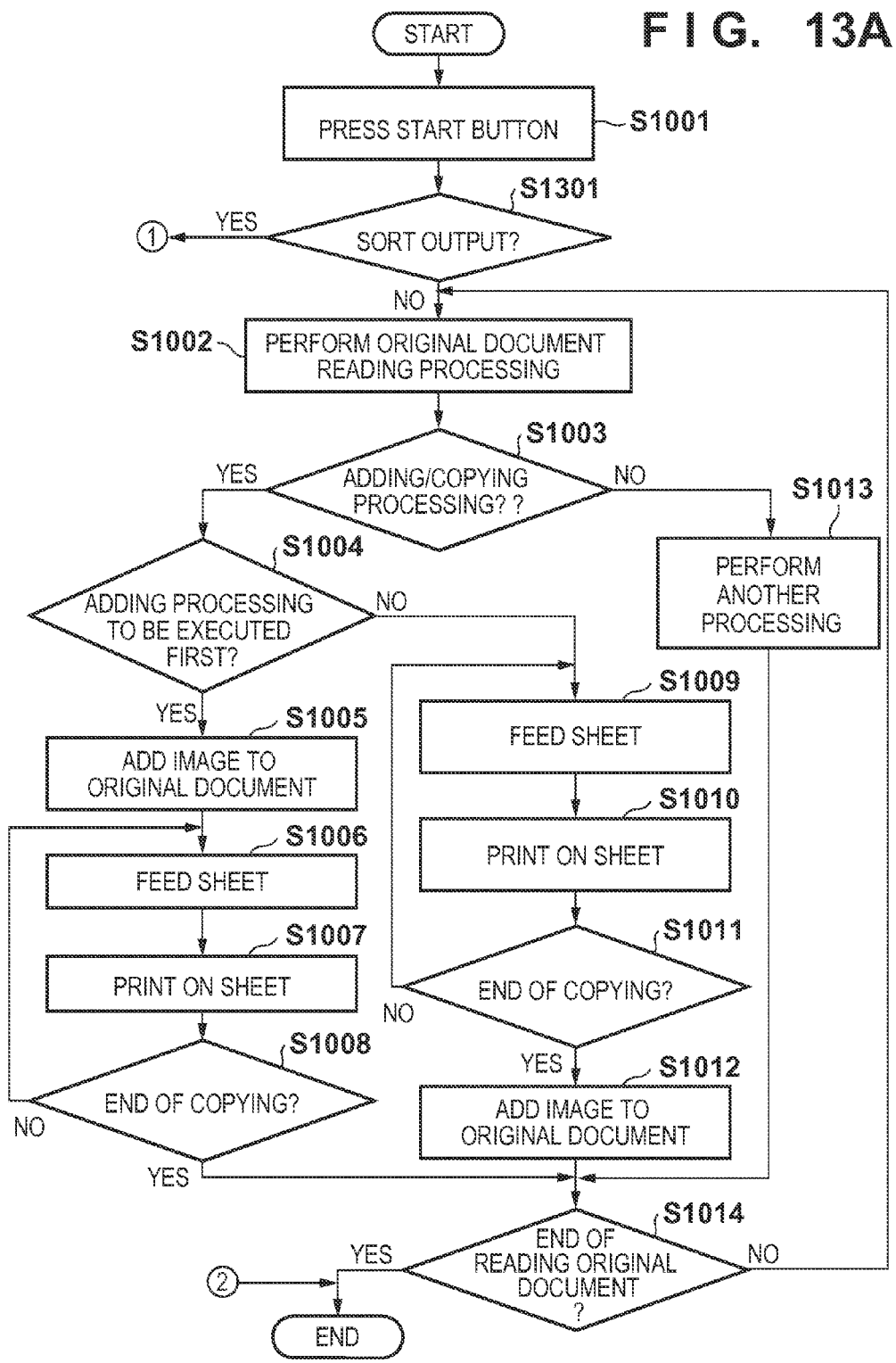

The sequence of adding/copying processing to be executed by an MFP 1 according to the second embodiment will be described with reference to FIGS. 13A and 13B. Processing to be described below is implemented in the MFP 1 when a control CPU 801 reads out and executes a program stored in a program memory 803. Note that steps S1001 to S1014 shown in FIG. 13A are the same as those in the first embodiment, and a description thereof will not be repeated.

In step S1301, the control CPU 801 determines whether to execute sort output to sort and output the image-added original documents G and the copied sheets S. Whether to execute sort output may be set by the user via a UI 850 in step S1001 or set in advance in the MFP 1. If the control CPU 801 determines in step S1301 to execute sort output, it advances the process to step S1302 (FIG. 13B); if it determines not to execute sort output, executes the processes in steps S1002 to S1014, similar to the first embodiment.

Even if it is set to execute sort output, when the number of original documents detected by an original document detection sensor (not shown) is only one, sorting of the original documents G and sheets S need not be performed. In this case, the control CPU 801 advances the process to step S1002 without performing the determination in step S1301.

If the control CPU 801 advances the process from step S1301 to step S1302, it determines in step S1302 whether the processing contents to be executed represent adding/copying processing, similar to step S1003. Note that the second embodiment performs determination based on processing contents set by the user via the UI 850, and does not perform determination based on the reading result of the original document G when execution of only copying processing is set, as exemplified in the first embodiment. Also, the second embodiment does not perform processing of determining which of adding processing and copying processing is to be executed first, unlike step S1004.

This is because when sort output according to the second embodiment is executed, original documents to which images have been added by adding processing, and sheets copied by copying processing need to be bundled and output, respectively. Since the original documents G and sheets S cannot be output by every original document, whether to execute adding processing needs to be decided before reading the original documents G. To execute adding processing for a predetermined form when the form is fed as the original document G from a second sheet feeding unit 90, the user needs to designate execution of adding processing (that is, execution of adding/copying processing) via the UI 850 in step S1001. Note that whether to execute adding processing in addition to copying processing may be determined in accordance with, for example, an image (original document image) read from the first original document G out of a plurality of original documents G set in the second sheet feeding unit 90.

When executing adding/copying processing, adding processing needs to be executed prior to copying processing. This is because copying processing needs to be executed at once for all the original documents G for the purpose of sort output, and reading processing of all the original documents G needs to be executed before the start of copying processing or in parallel to copying processing. In this case, to execute copying processing prior to adding processing, all the original documents G need to wait in the MFP 1 till the end of copying processing. It is generally difficult to keep all the original documents G waiting on the conveyance path. Considering this, a case in which adding processing is executed prior to copying processing will be described below.

If the control CPU 801 determines in step S1302 that the processing contents to be executed represent adding/copying processing, it advances the process to step S1303; if the control CPU 801 determines that the processing contents to be executed do not represent adding/copying processing, to step S1310.

(Case in which Processing Other than Adding/Copying Processing is Executed)

Processes in steps S1303 and S1304 are the same as those in steps S1002 and S1005. Note that (image data of) an image to be added which is saved in an image memory 804 may be one image common to a plurality of original documents or include a plurality of images corresponding to a plurality of original documents (an original document having a plurality of pages). In step S1304, therefore, the control CPU 801 uses one image to be added which is common to a plurality of original documents (pages) or images to be added which correspond to addition target original documents.

After step S1304, the control CPU 801 determines, in step S1305 based on whether the original document G to be read exists (remains), whether to end reading of the original document G, similar to step S1014. If the original document G remains in the second sheet feeding unit 90, the control CPU 801 determines not to end reading of the original document G, and returns the process to step S1303. If the original document G does not remain in the second sheet feeding unit 90, the control CPU 801 determines to end reading of the original document G, and advances the process to step S1306.

If the control CPU 801 advances the process from step S1305 to step S1306, adding processing for all the original documents G has ended, and the image-added original document bundle has been stacked on the first discharge unit 70 in the same order as the order in which the original documents G were stacked as an original document bundle in the second sheet feeding unit 90. In the image memory 804, image data corresponding to original document images obtained by reading all the original documents G have been saved.

Processing in step S1306 is the same as that in step S1006. Also, processing in step S1307 to be executed after step S1306 is almost the same as that in step S1007. In step S1307, unlike step S1007, (image data corresponding to) the images of a plurality of original documents (an original document having a plurality of pages) are saved in the image memory 804. Thus, in step S1307, the control CPU 801 stores the page of an original document image used in previous execution of step S1307, and sets the original document image of a page next to this page as a copying processing target. At this time, if the control CPU 801 executes step S1307 for the first time, or the page of an original document image used in previous execution of step S1307 is the final page, the control CPU 801 sets the original document image of the first page as a copying processing target, and executes step S1307.

After step S1307, the control CPU 801 determines in step S1308 whether copying processing has ended for all the pages of the original documents G. For example, if an original document image used in copying processing in step S1307 is the final page, the control CPU 801 determines that copying processing has ended for all the pages, and advances the process to step S1309; if NO, returns the process to step S1306.

If the control CPU 801 advances the process from step S1308 to step S1309, it determines in step S1309 whether copying (printing) processing by a copy count designated via the UI 850 has ended. If the control CPU 801 determines that copying processing by the designated copy count has not ended, it returns the process to step S1306 to continue copying processing. If the control CPU 801 determines that copying processing by the designated copy count has ended, it ends the process. If the process ends in step S1309, the image-added original document bundle and the copied sheet bundle have been sorted and stacked on the first discharge unit 70.

(Case in which Processing Other than Adding/Copying Processing is Executed)

If the control CPU 801 advances the process from step S1302 to step S1310, it executes processing contents (another processing such as single copying processing, single adding processing, or single reading processing) to be executed that have been set in step S1001, other than adding/copying processing, while sorting the original documents G or sheets S. When executing such processing, both the original document G and sheet S need not be conveyed to a transfer unit 15, unlike the above-described adding/copying processing. That is, the original document G and sheet S do not hinder each other on the conveyance path extending to the transfer unit 15.

Even when it is designated to sort and output image-added original documents and copied sheets, the second embodiment can obtain the same advantages as those of the first embodiment. Further, sorted original documents and sheets having undergone adding/copying processing can be output without a collision between an original document and a sheet on the commonly used conveyance path, improving user friendliness.

The second embodiment has explained a case in which one side of the original document G is read, adding printing is performed for this side, and the image of one side that has been read from the original document G is copied to one side of the sheet S. However, the present invention is not limited only to the single-sided processing. Similar to the modification to the first embodiment, for example, the second embodiment can be modified to read the two sides of the original document G, perform adding printing on the two sides, and copy, on the two sides of the sheet S, the images of the two sides that have been read from the original document G.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106316, filed May 7, 2012, which is hereby incorporated by reference herein in its entirety.

What is claimed is:

1. An image forming apparatus comprising:
   a reading unit configured to read an image of an original document;
   a printing unit configured to print an image; and
   a control unit configured to, after the reading unit performs reading processing to read the image of the original document, execute first printing processing to convey the original document and print the image on the original document by the printing unit, and second printing processing to convey a sheet from a sheet feeding unit and print the image read by the reading unit on the sheet by the printing unit,
   wherein in a case where the control unit executes both the first printing processing and the second printing processing, the control unit controls conveyance of the original document and the sheet so that a collision between the original document conveyed in the first printing processing and the sheet conveyed in the second printing processing does not occur.

2. The apparatus according to claim 1, wherein the control unit executes the second printing processing after the original document conveyed in the first printing processing is conveyed to the printing unit.

3. The apparatus according to claim 1, wherein the control unit starts execution of the second printing processing a predetermined time after a start of conveying the original document to the printing unit in the first printing processing.

4. The apparatus according to claim 3, wherein the predetermined time is determined as a time to prevent a collision on a conveyance path between the original document and the sheet which are conveyed to the printing unit in the first printing processing and the second printing processing, respectively.

5. The apparatus according to claim 1, wherein the control unit executes the first printing processing after the sheet conveyed in the second printing processing is conveyed to the printing unit.

6. The apparatus according to claim 5, wherein the control unit starts execution of the first printing processing a predetermined time after a start of conveying the sheet to the printing unit in the second printing processing.

7. The apparatus according to claim 6, wherein the predetermined time is determined as a time to prevent a collision on a conveyance path between the original document and the sheet which are conveyed to the printing unit in the first printing processing and the second printing processing, respectively.

8. The apparatus according to claim 1, wherein when printing an image on the sheet in the second printing processing, the control unit combines an image to be added with the image read by the reading unit, and controls the printing unit to print the combined image on the sheet.

9. The apparatus according to claim 1, wherein the control unit adjusts, in accordance with a position of an object contained in the image read by the reading unit, a position where an image to be added is printed on the original document.

10. The apparatus according to claim 1, wherein when reading images of a plurality of original documents by the reading unit, after an end of printing of images on the plurality of original documents by the printing unit, the control unit sequentially feeds a plurality of sheets from the sheet feeding unit, and controls the printing unit to sequentially print the images of the plurality of original documents on the plurality of sheets.

11. The apparatus according to claim 1, further comprising a selection unit configured to select printing processing to be preferentially executed out of the first printing processing and the second printing processing,
wherein the control unit executes printing processing selected by the selection unit in preference to printing processing not selected by the selection unit.

12. A method of controlling an image forming apparatus, comprising:
a control step of, after a reading unit configured to read an image of an original document performs reading processing to read the image of the original document, executing first printing processing to convey the original document and print the image on the original document by a printing unit, and second printing processing to convey a sheet from a sheet feeding unit and print the image read by the reading unit on the sheet by the printing unit,
wherein in the control step, in a case where both the first printing processing and the second printing processing are executed, conveyance of the original document and the sheet is controlled so that a collision between the original document conveyed in the first printing processing and the sheet conveyed in the second printing processing does not occur.

13. A non-transitory, computer-readable storage medium storing a computer program for causing a computer to execute steps of the method of controlling the image forming apparatus according to claim 12.

* * * * *